BETSEY H. ROBBINS & E. W. TURNER.
Steak-Mangles.

No. 150,893. Patented May 12, 1874.

WITNESSES

INVENTORS
Betsey H. Robbins,
Edward W. Turner,
By Chipman & Forster
ATTORNEYS.

UNITED STATES PATENT OFFICE.

BETSEY H. ROBBINS AND EDWARD W. TURNER, OF NEWTON FALLS, OHIO; SAID ROBBINS ASSIGNOR TO SAID TURNER.

IMPROVEMENT IN STEAK-MANGLES.

Specification forming part of Letters Patent No. 150,893, dated May 12, 1874; application filed January 31, 1874.

*To all whom it may concern:*

Be it known that we, BETSEY H. ROBBINS and EDWARD W. TURNER, of Newton Falls, in the county of Trumbull and State of Ohio, have invented a new and valuable Improvement in Steak-Mangles; and we do hereby declare that the following is a full, clear, and exact description of the construction and operation of the same, reference being had to the annexed drawings making a part of this specification, and to the letters and figures of reference marked thereon.

Figure 1:
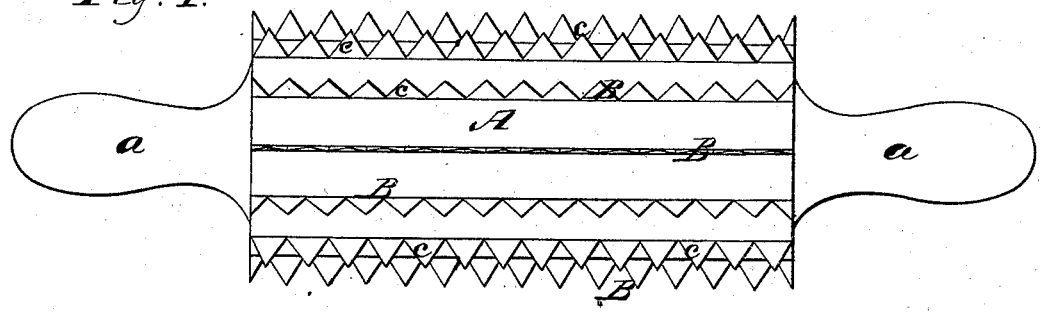
Figure 2:
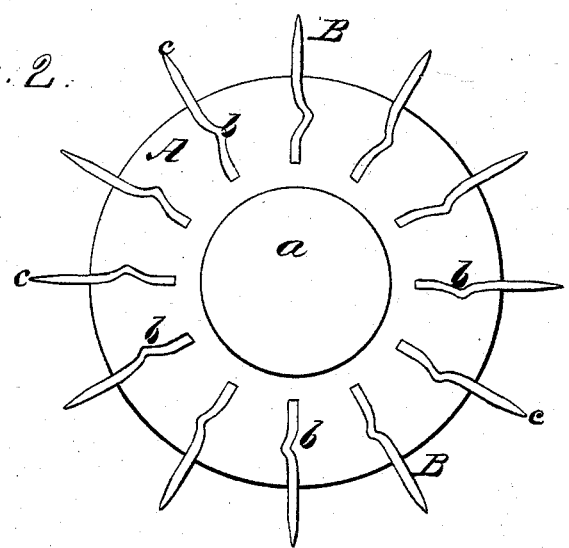
Figure 3:
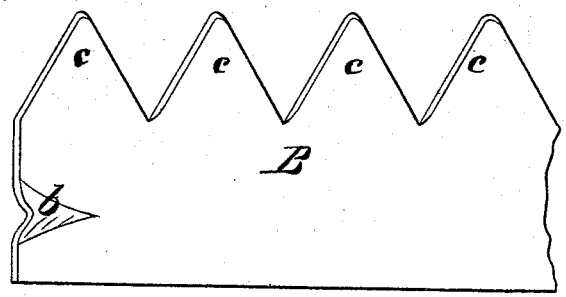

Figure 1 of the drawings is a representation of a front view of our steak-mangle. Fig. 2 is an end view of the same. Fig. 3 is a detail view of the same.

This invention has relation to devices for mangling beefsteak for the purpose of making it tender; and it consists in chisel-edged angular teeth inserted into a cylinder having handles on its ends, and secured in this cylinder by indenting the ends of the metal strips on which the said teeth are formed, as will be further explained hereinafter.

The following is a description of our improvement:

In the annexed drawings, A designates a cylinder of wood, having handles, $a\ a$, on its ends, like the well-known rolling-pin used in the culinary department. B B represent metal strips having V-shaped teeth formed on them. These teeth $c$ are sharpened so as to present beveled or chisel edges, and the metal strips on which they are formed are inserted into kerfs made longitudinally into the cylinder A.

To prevent the toothed plates from working loose or becoming detached from the cylinder A their ends are struck up or indented, as shown at $b$. This can be readily done, after the plates are inserted into their places, by means of a small tool having a chisel edge.

It will be seen from the above description that we have a very simple and easily-made device, with which meat can be mangled and rendered tender by simply rolling it over the meat when the same is upon a hard flat surface.

What we claim as new, and desire to secure by Letters Patent, is—

The steak-mangle consisting of the roller A, provided with a handle at each end, and having toothed plates B inserted into it, and secured by the indentations $b$, as shown and described.

In testimony that we claim the above we have hereunto subscribed our names in the presence of two witnesses.

BETSEY HOADLEY ROBBINS.
EDWARD WYETT TURNER.

Witnesses:
B. F. HAWN,
JOHN F. BEAVER.